Nov. 19, 1940.  J. P. McCARTHY  2,222,111
RAMP AND STOP FOR LIFTS
Filed June 12, 1939
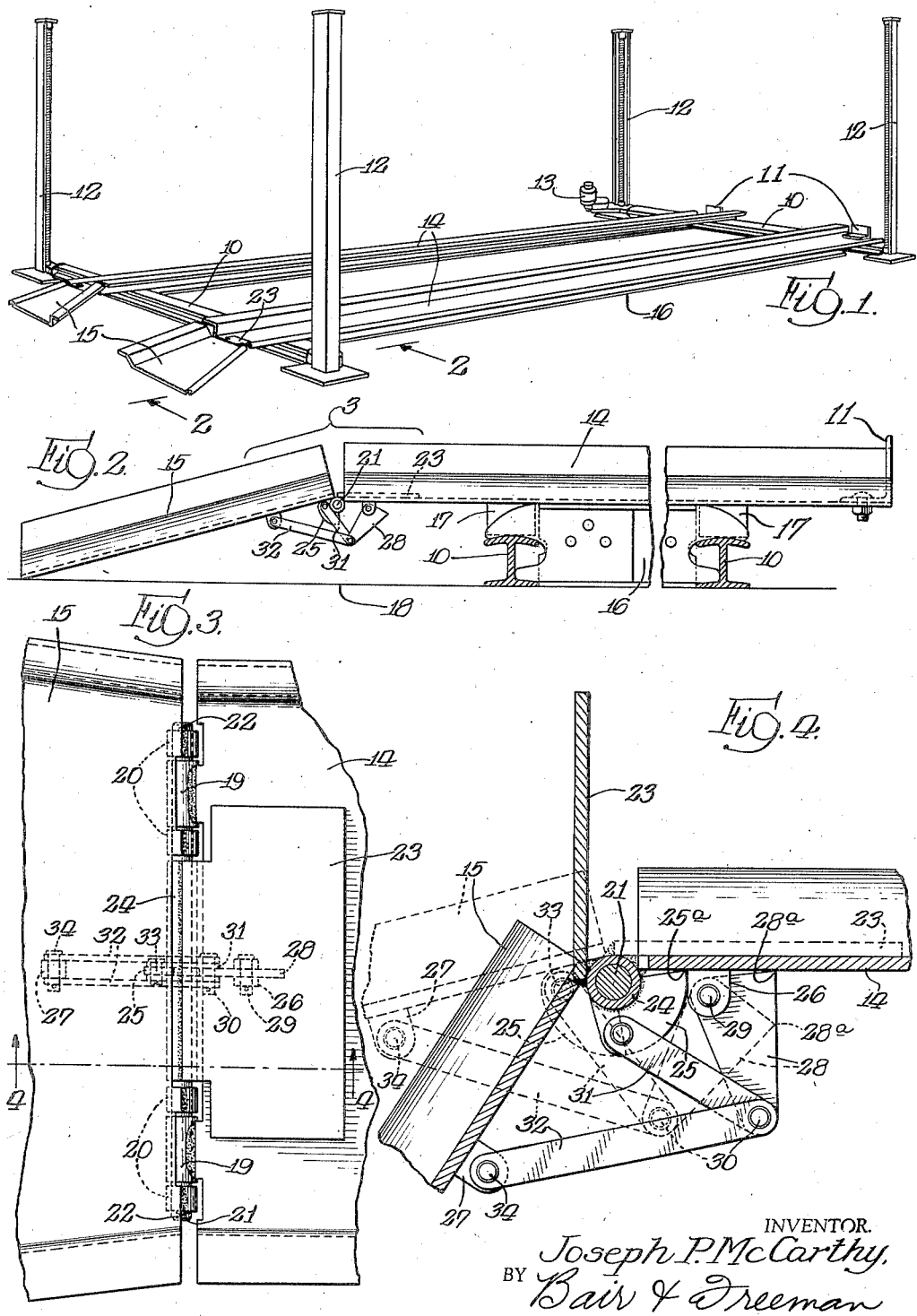
INVENTOR.
Joseph P. McCarthy,
BY Bair & Freeman
ATTORNEYS.

Patented Nov. 19, 1940

2,222,111

UNITED STATES PATENT OFFICE 2,222,111

RAMP AND STOP FOR LIFTS

Joseph P. McCarthy, Defiance, Ohio, assignor to Modern Equipment Corporation, Defiance, Ohio, a corporation of Ohio Application June 12, 1939, Serial No. 278,610

1 Claim. (Cl. 254—89)

An object of my invention is to provide an automatically operable ramp and stop for lifts wherein the ramp may move to an approach position as the lift is lowered, or to a depending position as it is raised, and will operate the stop to either a supine position where the wheels of the vehicle may be driven over it or to an upright position to serve as a stop, respectively.

Another object is to provide a ramp element and a stop plate pivoted to the end of a drive-on rail of a lift and so interconnected mechanically, by means of links, pivot pins and levers, that movement of the ramp from an approach position to a depending position will raise the stop plate from a supine position to an upright stop position.

More particularly it is my object to provide the ramp element and stop plate pivoted to the drive-on rail by means of pivot sleeves and a pivot pin and the mechanical connections provided in the form of lugs connected with the rail, ramp element and stop plate, and lever and link connections between the lugs to effect the desired automatic movement of the parts during operation.

In the accompanying drawing I have shown a preferred embodiment of my invention. The drawing is not intended to be exhaustive and is not to be taken as limiting of the invention, but on the contrary is chosen with a view to illustrating my invention so that others skilled in the art may apply it under varying conditions of practical use and may make such modifications and changes therein as such conditions may make desirable.

Figure 1 is a perspective view of a lift structure to which my invention has been applied;

Figure 2 is an enlarged sectional view on the line 2—2 of Figure 1;

Figure 3 is an enlarged plan view of the portion indicated at 3 in Figure 2, and Figure 4 is an enlarged sectional view on the line 4—4 of Figure 3 showing the parts in a different position from that of Figure 2.

On the accompanying drawing, I have used the reference numeral 10 to indicate an end rail of a lift. Two of the rails 10 are provided and their ends may be elevated in a suitable manner relative to posts 12. A motor 13 is illustrated for accomplishing such elevation, although the necessary mechanism operated by the motor 13 is not disclosed as it forms no part of my invention. It is disclosed, however, in the Myers Patent No. 2,099,274, of November 16, 1937.

The lifting platform further includes drive-on rails 14 supported by the end rails 10. A permanent stop in the form of an angle bar 11 is mounted on one end of each rail 14. The ends of the rails 14 overhang the rails 10, as shown in Figure 2, and ramp elements 15 are provided for convenience in driving an automobile onto the drive-on rails 14, which are somewhat elevated above the floor surface by the end rails 10 and by re-enforcing I beams 16 mounted under the drive-on rails 14. At 17 I illustrate small sections of angle bar for the purpose of taking the thrust between the upper surfaces of the end rails 10 and the lower surfaces of the drive-on rails 14.

The ramp elements 15 are pivoted to the drive-on rails 14 so that they assume an approach position, as shown in Figure 2, when the lift is in lowered position, the floor indicated at 18 then serving to support the free ends of the ramp elements. The pivotal connections consist of sleeves 19 welded to the end of the drive-on rail 14 and sleeves 20 welded to one edge of the ramp element. A pivot pin 21 extends through all six of the ears 19 and 20 and may be retained in position by cotter pins 22.

A stop plate 23 is also pivoted on the pin 21, the stop plate having a pivot sleeve 24 for this purpose welded to one edge of the plate.

The ramp element 15 is adapted to assume a depending position, as shown in Figure 4, when the lift is raised, such position being a result of the ramp element leaving the floor 18 and the weight of the ramp element swinging it downwardly. I take advantage of the weight of the ramp element to lift the stop plate 23 from a normally supine position, as shown in Figure 2 and by dotted lines in Figure 4, to an upright stop position by the following described means:

A sector-shaped lug 25 is welded to the sleeve 24 and lugs 26 and 27 are welded to the drive-on rail 14 and the ramp element 15 respectively. A lever 28 is pivoted at 29 to the lug 26. The lever 28 carries a pivot pin 30 to which is pivoted a pair of short links 31 and a pair of long links 32. The short links 31 straddle the lug 25 and are pivoted thereto by a pin 33. The links 32 straddle the lug 27 and are pivoted thereto by a pin 34.

The pin 33, it will be noted, is closer to the axis of the pivot pin 21 than is the pivot pin 34. Accordingly, for any given movement of the pin 30, the pin 33 will move through a greater angle than the pin 34. Therefore, it is evident that movement of the ramp element 15 through less than ninety degrees of movement, as shown by comparing the solid and dotted lines in Figure 4, will result in movement of the stop plate 23 through substantially ninety degrees of movement, as shown by similar comparison of this element. When the ramp element 15 assumes its depending position due to gravity, as shown by solid lines in Figure 4, a corner 28a of the lever 28 strikes the lower surface of the drive-on rail 14 to act as a stop. A corner 25a of the lug 25 similarly serves as a stop, so that these two corners together serve as a substantial means to stop the plate 23 in upright position, where it may serve as an effective stop against the vehicle rolling back off the lift.

With this arrangement, it is unnecessary to depend upon the human element in providing a stop for the vehicle after it is on the lift. Instead, by merely driving on to the lift, the stop plate 23 is automatically raised soon after the lift has started to be elevated, and the operator is thus insured against the vehicle rolling off the lift while in its raised position.

The mechanism for operating the stop plate from the movement of the ramp element is very simple, yet rigid and effective as a substantial means to stop the vehicle from rolling off the lift.

In the operation of the ramp and stop, the ramp element serves as a weight element to elevate the normally supine stop plate to a stop position. In this respect the ramp element can serve only this one purpose, if desired, instead of also acting as a ramp for the vehicle when driven onto the lift.

Having described one specific embodiment of my invention together with the operation thereof, I desire it to be understood that this form is selected merely for the purpose of facilitating disclosure of the invention rather than for the purpose of limiting the number of forms which it may assume. It is to be further understood that various modifications, adaptations and alterations may be applied to the specific form disclosed to meet the requirements of practice without in any manner departing from the spirit and scope of the present invention except as set forth in the claim appended hereto.

I claim as my invention and desire to secure by Letters Patent of the United States:

In a ramp and stop for lifts, a ramp element having an edge thereof pivoted to an end of a drive-on lift rail, said ramp element having an ear and being adapted to assume either an approximately horizontal approach position by engagement of the free end of the ramp element with a floor surface or an approximately vertical depending position, said latter position being assumed by elevation of the lift rail above the floor surface, a stop plate pivoted to said end of said lift rail and adapted to assume either an upright stop position or a supine position permitting an automobile wheel to be driven thereover, an ear on said stop plate, a lever pivoted to the under side of said rail, link connections between said ear of said stop plate and said lever and between said ear of said ramp element and said lever, the first link connection being closer to the pivotal axis of said stop plate than the second one is to the pivotal axis of said ramp element whereby movement of said ramp element through less than a right angle of movement will move said stop plate through substantially a right angle of movement, said lever and said ear on said stop plate each having a stop portion to limit their movement to ramp element lowered and stop element raised positions.

JOSEPH P. McCARTHY.